(12) United States Patent
Kurihara et al.

(10) Patent No.: US 6,470,056 B1
(45) Date of Patent: Oct. 22, 2002

(54) OFFSET QPSK MODULATION ANALYTIC SYSTEM

(75) Inventors: Toshiaki Kurihara; Michiaki Arai, both of Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/418,403

(22) Filed: Oct. 14, 1999

(30) Foreign Application Priority Data

Oct. 14, 1998 (JP) .......................................... 10-307867

(51) Int. Cl.[7] .............................................. H04L 27/10
(52) U.S. Cl. ...................... 375/281; 375/226; 375/261; 375/316; 375/323; 375/326
(58) Field of Search ................................ 375/281, 226, 375/261, 316, 323, 326

(56) References Cited

U.S. PATENT DOCUMENTS 5,745,525 A * 4/1998 Hunsinger et al. .......... 375/147
5,946,359 A * 8/1999 Tajiri et al. .................. 329/304
5,999,223 A * 12/1999 Patel et al. .................. 348/555
6,160,838 A * 12/2000 Shinohara et al. .......... 375/130

* cited by examiner

Primary Examiner—Chi Pham
Assistant Examiner—Pankaj Kumar
(74) Attorney, Agent, or Firm—Dellett and Walters

(57) ABSTRACT

The offset QPSK modulation analytic system capable of estimating the initial phase of an offset QPSK modulated signal is disclosed. For each of a plurality of candidate values for the initial phase, the correlation coefficient between a signal whose clock delay has been estimated and compensated and an ideal signal generated based on the signal is computed, and the candidate value having the maximum value of the computed correlation coefficient is estimated as the optimum initial phase.

8 Claims, 8 Drawing Sheets

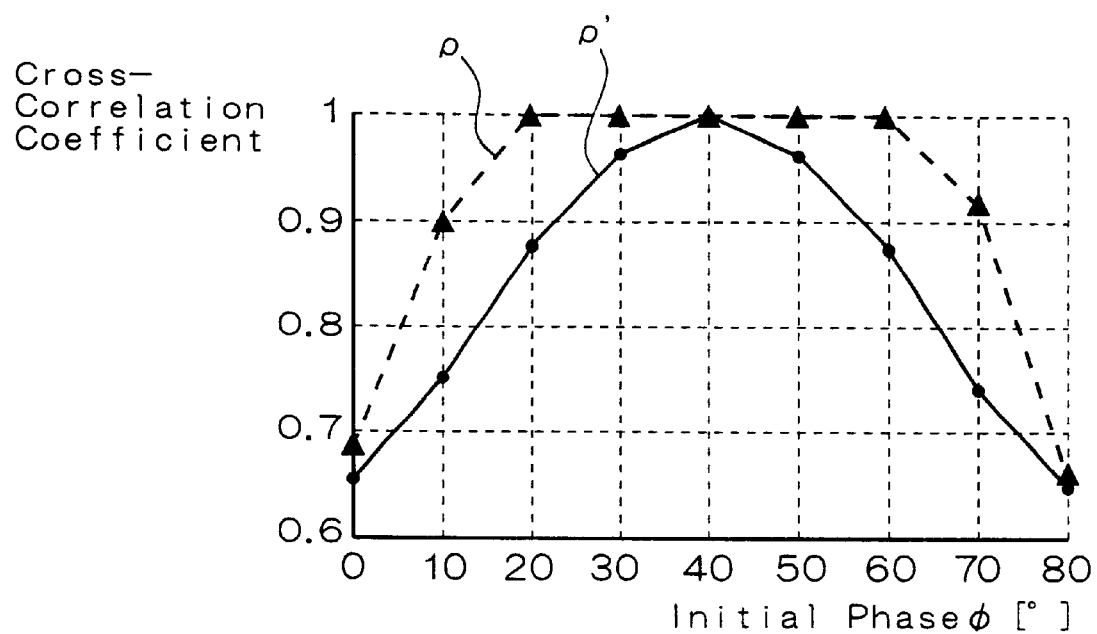
F I G. 6

OFFSET QPSK MODULATION ANALYTIC SYSTEM

BACKGROUND OF THE INVENTION

The present invention relates to an offset QPSK modulation analytic system for analyzing a transmitter waveform quality factor, etc. by receiving a signal modulated in an offset QPSK (OQPSK) system.

A digital cellular system in a CDMA system excels in communications quality and has been put to practical use also in Japan. In this digital cellular system, the QPSK modulation system is used in a forward link through which data is transmitted, for example, from a base station to a mobile station, and on the other hand, the OQPSK modulation system is used in an reverse link through which data is transmitted from the mobile station to the base station. In the digital cellular system, it is necessary to measure the waveform quality, etc. based on an actually received signal, and analyze it to maintain excellent communications quality.

FIG. 8 shows the outline of the coherent detection in a common transmission and reception system using an orthogonal modulation system. On a transmission side, an in-phase component I is multiplied by a local signal (carrier signal) at a predetermined frequency, an quadrature component Q is multiplied by a signal obtained by shifting the phase of the local signal by 90°, and the resultant signals obtained as the multiplication results are combined for transmission. On a receiving side, the frequency of a received signal is converted using a local signal having the same frequency as the signal on the transmission side and also using a signal obtained by shifting the phase of the local signal by 90°, and the in-phase component I and the quadrature component Q are separated from each other by passing the two types of frequency converted signals through a low-pass filter (LPF).

When a signal is transmitted and received by the above described orthogonal detection, and if there is a phase difference between the local signals on the transmission and receiving sides (the phase difference is referred to as an 'initial phase'), then the initial phase is compensated on the receiving side so that the local signals on the transmission side and the receiving side should be synchronized with each other. For example, it is common that the phase of a local signal is synchronized on the receiving side using a well-known data pattern such as a synchronization word contained in communications data, etc.

When the QPSK modulation analysis is performed, any of the four variations of absolute phases, that is, +45°, +135°, −45°, and −135°, is applicable even when the initial phase is not known. If the symbol positions or points at the in-phase component I and the quadrature component Q can be obtained, the initial phase can be specified by forcibly assigning the leading symbol position to any of the four absolute phases.

Although the OQPSK modulation system is adopted, the symbol position of the in-phase component I can match the symbol position of the quadrature component Q by, for example, forcibly shifting the symbol position of the quadrature component Q by ½ symbol only if the initial phase and the frequency error can be specified by any means. As a result, a clock delay can be estimated and compensated in the same manner as in the QPSK modulation system, thereby successfully analyzing the waveform quality, etc. of an actual signal.

However, in the OQPSK modulation system, the initial phase cannot be specified by the method in the QPSK modulation system when there is a ½ symbol difference in time between the symbol position of the in-phase component I and the symbol position of the quadrature component Q. Therefore, the offset of the quadrature component Q cannot be eliminated. As a result, the conventional technology which estimates a clock delay and analyzes the waveform quality, etc. of an actual signal cannot be utilized.

The present invention has been developed to solve the above described problems, and aims at providing an offset QPSK modulation analytic system capable of specifying the initial phase contained in a received signal in the offset QPSK modulation system, and estimating a clock delay by regaining the QPSK modulation signal.

SUMMARY OF THE INVENTION

In a preferred embodiment of the present invention, in the offset QPSK modulation analytic system according to the present invention, the correlation coefficient is computed by a correlation coefficient computation unit between a signal (actual signal) obtained by actually performing a phase compensation using a predetermined candidate value of an initial phase and an ideal signal generated by repeating the offset QPSK demodulation and modulation on the obtained actual signal. Based on the computed correlation coefficient, the initial phase determination unit determines whether or not the candidate value of the initial phase is appropriate. The closer to the true value the candidate value of the initial phase is, the more alike the waveforms of the actual signal and the ideal signal become. Since the correlation coefficient of these two signals is a large value, the initial phase can be appropriately estimated using the correlation coefficient.

Especially, according to the present invention, the clock delay is estimated by generating a QPSK signal by eliminating the offset of the quadrature component of the signal after compensating the initial phase. Then, the correlation coefficient is calculated by a signal compensated corresponding to the estimated clock delay. Since a correct initial phase and a frequency error are estimated, and the offset of the quadrature component of a corrected signal is eliminated, a clock delay can be estimated. Using an actual signal corrected by compensating the clock delay and an ideal signal, the correlation coefficient between the two signals is obtained, thereby further improving the estimation precision of the initial phase.

Furthermore, it is desired that the above described initial phase determination unit retrieves the maximum value from among a plurality of correlation coefficients computed corresponding to each of a plurality of candidate values of the initial phase, and a corresponding candidate value is estimated as an initial phase. By using the above described correlation coefficient, the optimum value in the plurality of candidate values can be extracted, thereby easily estimating the initial phase.

In addition, it is desired that the estimation precision can be progressively enhanced by performing an estimating operation by the above described initial phase determination unit step by step and setting a plurality of candidate values used in each of the subsequent estimating operations based on the estimation result in the preceding step. When the estimating operation is performed step by step, an efficient initial phase estimating operation can be performed by first roughly estimating the initial phase, and then enhancing the estimation precision closer to the true value. Practically, to progressively improve the estimation precision, the interval among the plurality of candidate values may be set smaller, or the signal length whose correlation coefficient is to be computed may be set larger. Thus, an initial phase can be estimated with a smaller error.

BRIEF DESCRIPTION OF THE DRAWINGS

FIG. 6 is a view showing the comparison between the cross-correlation coefficient and its real part;

DESCRIPTION OF THE PREFERRED EMBODIMENTS

The OQPSK modulation analytic system according to an embodiment of the present invention will be described below by referring to the attached drawings.

Figure 1:
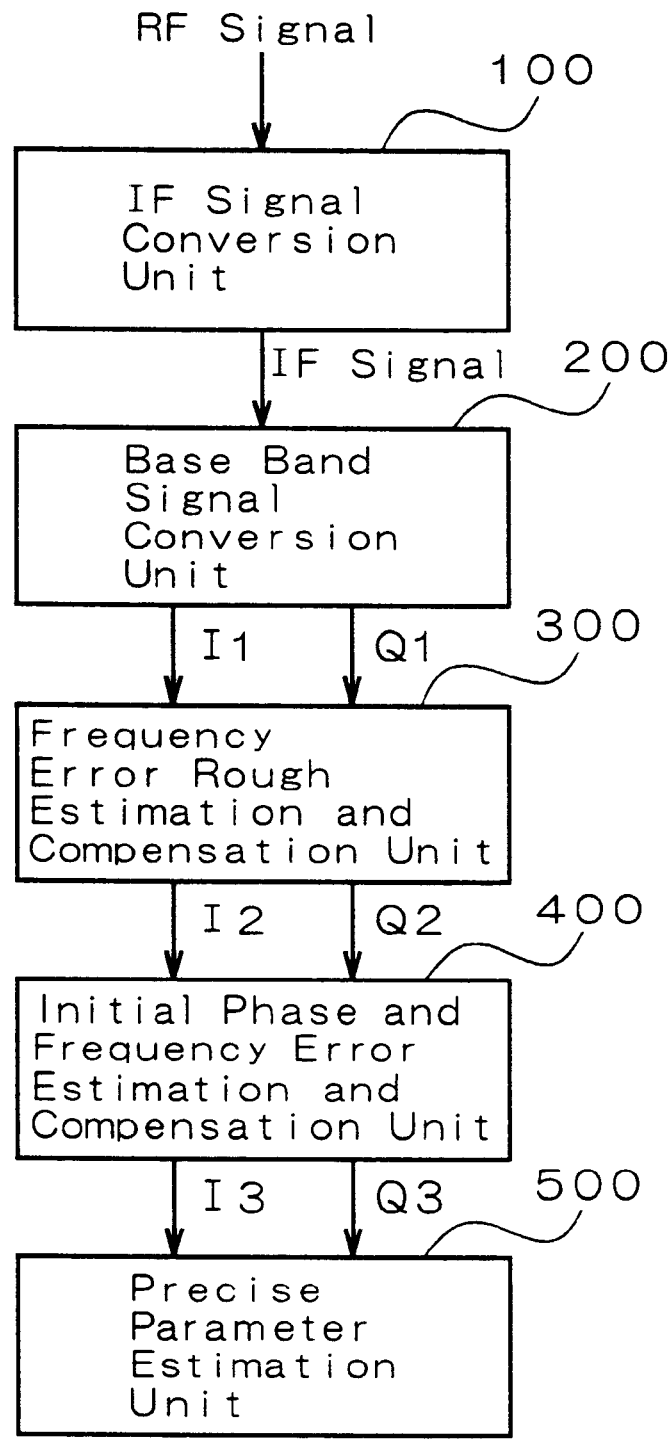
FIG. 1 is a view showing the configuration of the modulation analytic system according to an embodiment of the present invention.

FIG. 1 is a view showing the configuration of the OQPSK modulation analytic system according to an embodiment of the present invention. The OQPSK modulation analytic system according to the present embodiment shown in FIG. 1 comprises an IF signal conversion unit 100, a base band signal conversion unit 200, a frequency error rough estimation and compensation unit 300, an initial phase and frequency error estimation and compensation unit 400, and a precise parameter estimation unit 500. The frequency error rough estimation and compensation unit 300 corresponds to the third compensation unit, and the precise parameter estimation unit 500 corresponds to a parameter estimation unit.

The IF signal conversion unit 100 performs a sampling process and a quantizing process after converting an RF signal (high-frequency signal) to be measured into a predetermined IF signal (intermediate frequency signal), and outputs digital data corresponding to the IF signal. In addition, the base band signal conversion unit 200 generates a base band signal comprising an in-phase component I1 and an quadrature component Q1 based on data input from IF signal conversion unit 100. When the frequency error of a carrier frequency is large, the frequency error rough estimation and compensation unit 300 roughly estimates the frequency error, and compensates the estimated error for an input base band signal as necessary. When the frequency error is extremely large, it may be difficult to estimate an initial phase, etc. Therefore, the frequency error is roughly estimated and compensated before estimating the initial phase. Each time the initial phase and frequency error estimation and compensation unit 400 varies the values of an initial phase, it estimates and compensates the clock delay, computes the correlation coefficient between the actual signal and the ideal signal, estimates an appropriate initial phase and frequency error by using the value of the correlation coefficient, and makes an compensation based on the estimation result. The precise parameter estimation unit 500 estimates a parameter precisely using a signal compensated based on the estimated initial phase and frequency error. For example, parameters are computed for waveform quality, modulation accuracy, magnitude error, phase error, origin offset, etc. The above described operations are described below in detail.

[IF Signal Conversion Unit]

Figure 2:
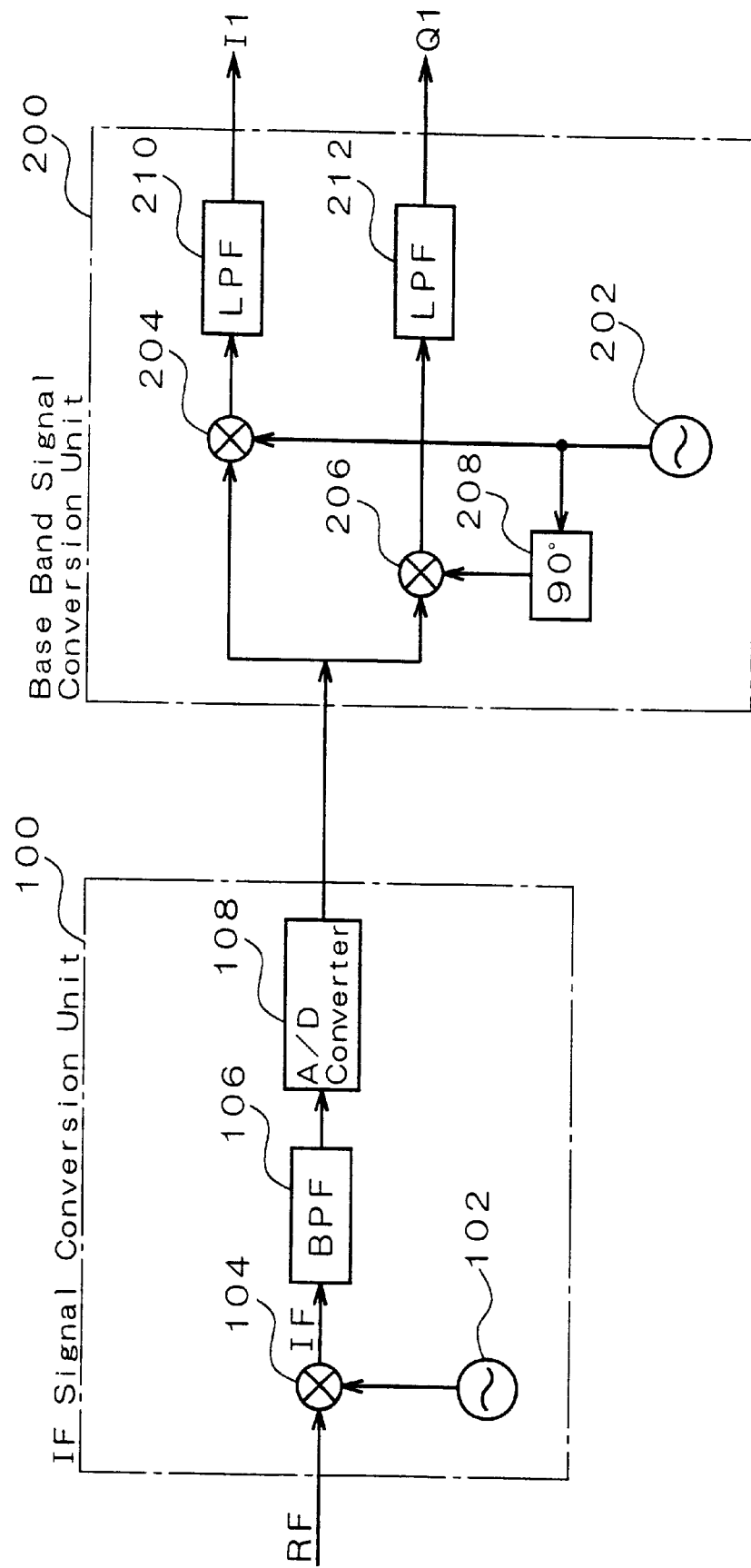
FIG. 2 is a view showing the detailed configuration of the IF signal conversion unit and the base band signal conversion unit.

FIG. 2 is a view showing the detailed configuration of the IF signal conversion unit 100 and the base band signal conversion unit 200. As shown in FIG. 2, the IF signal conversion unit 100 comprises a local oscillator 102, a frequency converter 104, a band pass filter (BPF) 106, and an analog-digital (A/D) converter 108. An input RF signal (OQPSK signal) is mixed with an oscillated signal output from the local oscillator 102 by the frequency converter 104, and is converted into an analog IF signal corresponding to the frequency difference between the RF signal (OQPSK signal) and the oscillated signal. The frequency of the IF signal can be converted into digital data by the A/D converter 108 at a later stage, and has to contain the modulation band width of a modulation signal. After the band pass filter 106 has removed the aliasing component in the band limiting process, the IF signal output from the frequency converter 104 is converted into digital data by the A/D converter 108. For example, a sampling process and a quantizing process are performed at a frequency eight times as high as the symbol frequency of the OQPSK signal.

[Base Band Signal Conversion unit]

As shown in FIG. 2, the base band signal conversion unit 200 comprises a local oscillator 202, multipliers 204 and 206, a phase shifter 208, low pass filters (LPF) 210 and 212. A digital IF signal output from the A/D converter 108 in the IF signal conversion unit 100 is multiplied by a 90° shifted local signal by the two multipliers 204 and 206. Then, the multiplication results are passed through the low pass filters 210 and 212 so that a base band signal comprising an in-phase component I1 and an quadrature component Q1 can be obtained.

[Frequency Error Rough Estimation and Compensation Unit]

Figure 3:
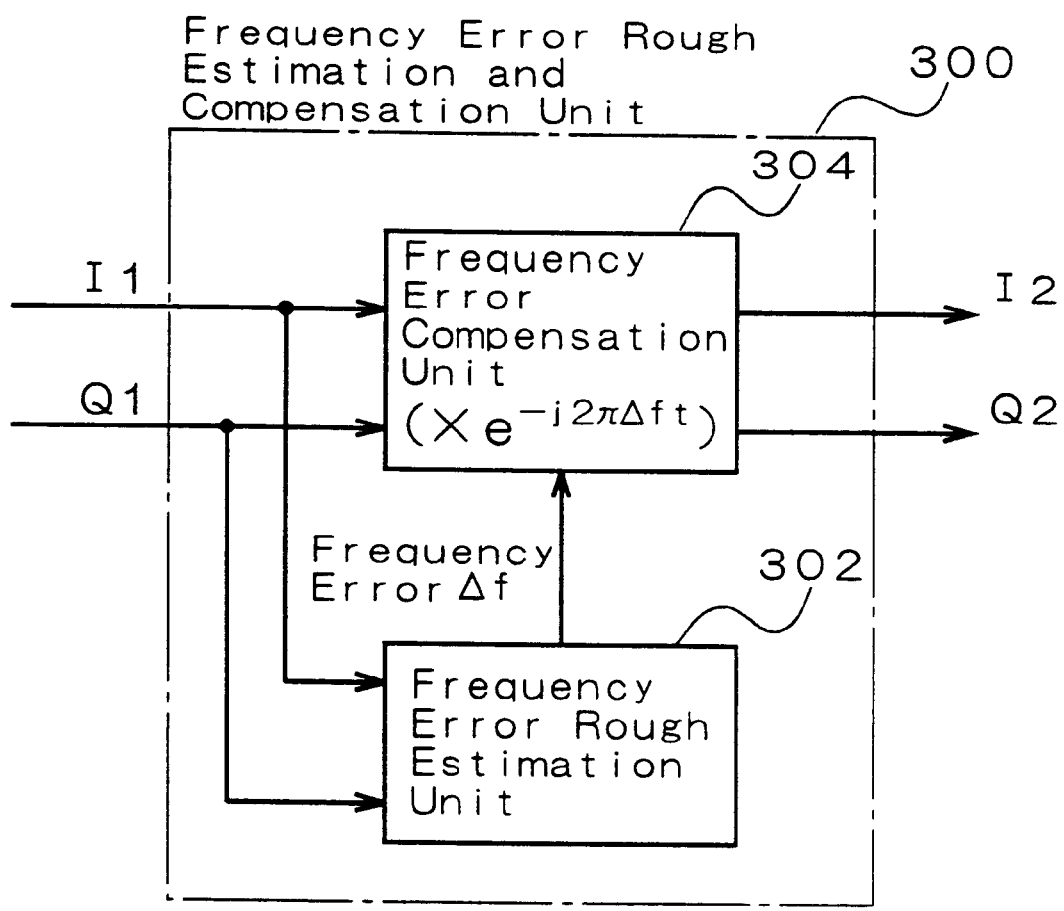
FIG. 3 is a view showing the detailed configuration of the frequency error rough estimation and compensation unit.

FIG. 3 is a view showing the detailed configuration of the frequency error rough estimation and compensation unit 300. As shown in FIG. 3, the frequency error rough estimation and compensation unit 300 comprises a frequency error rough estimation unit 302 and a frequency error compensation unit 304. The frequency error rough estimation unit 302 performs a fast Fourier transform (FFT) on a signal string obtained by raising a base band signal input from the base band signal conversion unit 200 to the fourth power ($(I+jQ)^4$), and detects the peak frequency $f_{peak}$, thereby roughly estimating the frequency error. Raising the signal to the fourth power makes the phase of the base band signal corresponding to each symbol of the OQPSK modulation multiplied by several times $2\pi$, thereby degenerating the phase. Thus, the frequency error component has a large peak at the position where the signal is quadruple. By dividing the $f_{peak}$ frequency by 4, the frequency error $\Delta f$ can be roughly estimated. By estimating the frequency error in the above described method, the frequency error can be obtained by the resolution of four times the resolution of the FFT operation.

The frequency error compensation unit 304 computes $\exp(-j2\pi\Delta ft)$ using the frequency error $\Delta f$ estimated by the frequency error rough estimation unit 302, multiplies the input base band signal $(I+jQ)$ by the complex number, thereby compensating the frequency error of the base band signal. The frequency error compensated base band signal is input to the initial phase and frequency error estimation and compensation unit 400 at the subsequent state.

[Initial Phase and Frequency Error Estimation and Compensation Unit]

Figure 4:
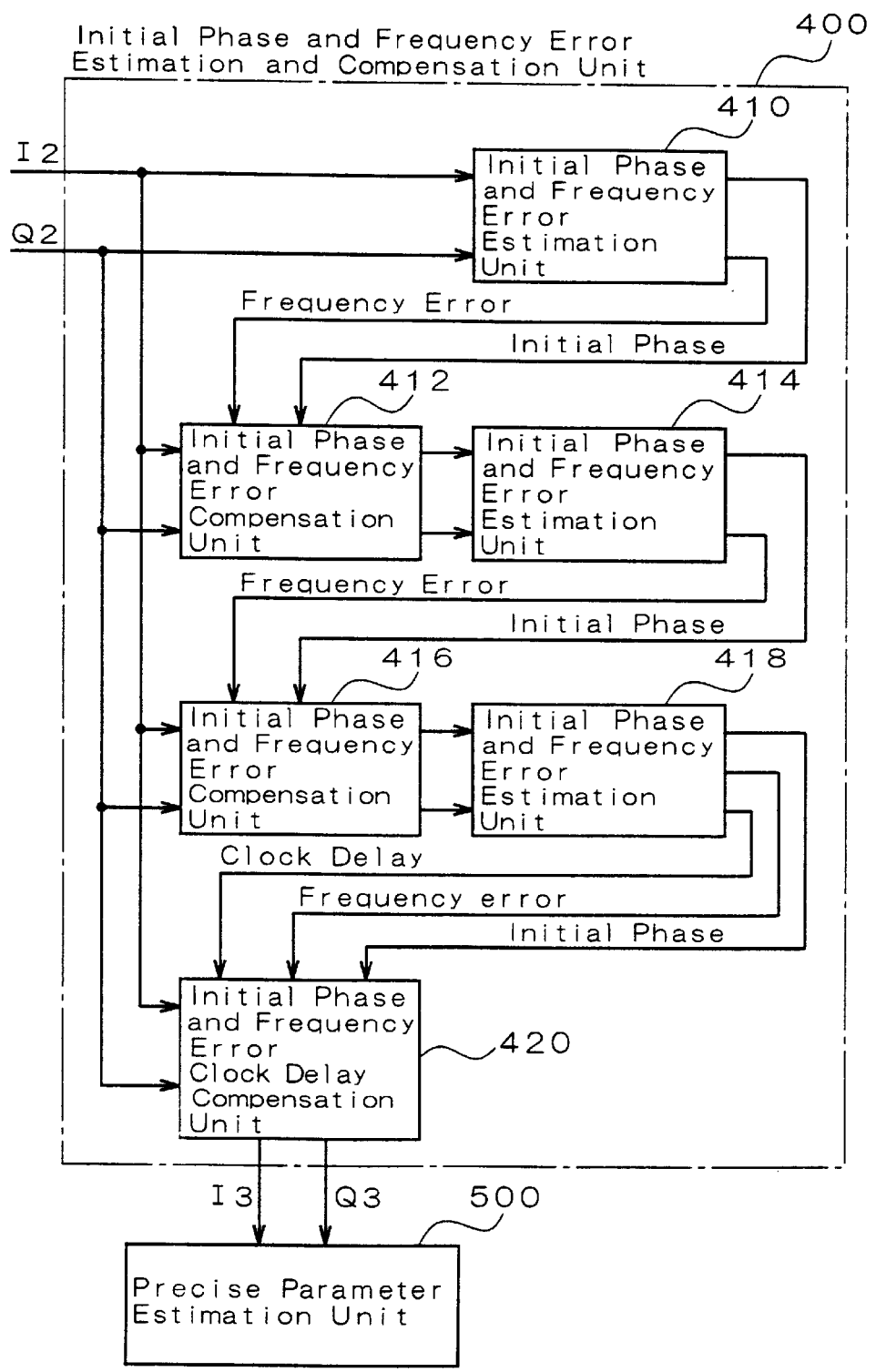
FIG. 4 is a view showing the detailed configuration of the initial phase and frequency error estimation and compensation unit.

FIG. 4 is a view showing the detailed configuration of the initial phase and frequency error estimation and compensation unit 400. As shown in FIG. 4, the initial phase and frequency error estimation and compensation unit 400 comprises three initial phase and frequency error estimation units 410, 414, and 418, two initial phase and frequency error compensation units 412 and 416, and an initial phase, frequency error, and clock delay compensation unit 420. The initial phase and frequency error compensation units 412 and 416, and the initial phase, frequency error, and clock delay compensation unit 420 correspond to the fifth compensation unit.

The initial phase and frequency error estimation unit 410 computes for a base band signal input from the frequency error rough estimation and compensation unit 300 the actual signal and the ideal signal after compensating the phase using a plurality of candidate values of the prepared initial phase. The value closest to the true value is extracted from among the plurality of above described candidate values by using the correlation coefficient of these two signals. In this example, the ideal signal refers to a signal obtained by performing the OQPSK demodulating process and the OQPSK modulating process on a target base band signal, and to a signal containing no waveform distortion, etc. generated in a transmission system.

The initial phase and frequency error estimation unit 410 compensates the phase of the input base band signal using the extracted value of the initial phase, compensates the clock delay using the clock delay estimation and the estimated value, and then estimates the frequency error.

Figure 5:
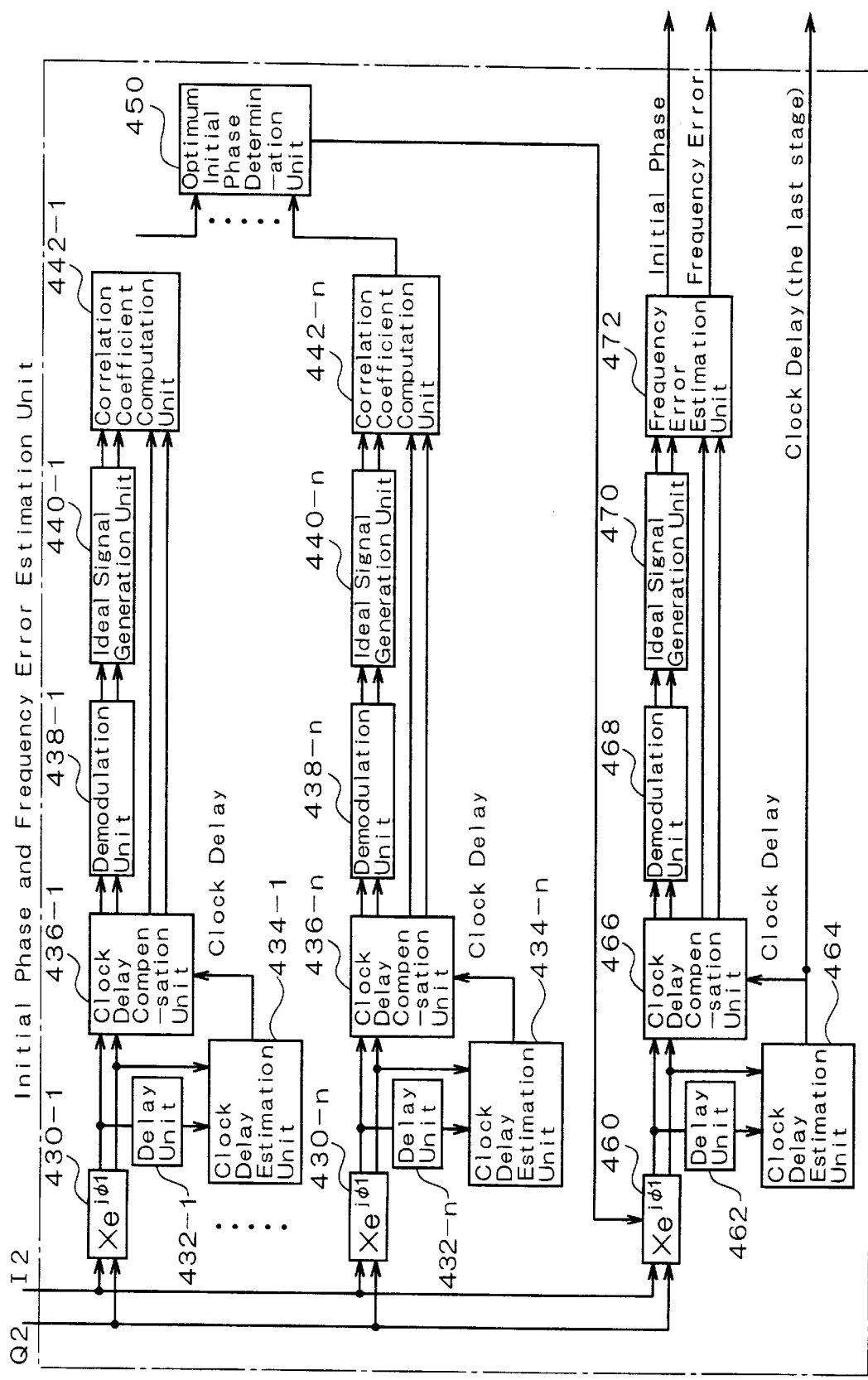
FIG. 5 is a view showing the detailed configuration of the initial phase and frequency error estimation unit.

FIG. 5 is a view showing the detailed configuration of the initial phase and frequency error estimation unit 410. Two other initial phase and frequency error estimation units 414 and 418 have the similar configurations. As shown in FIG. 5, the initial phase and frequency error estimation unit 410 comprises n sets of a phase compensation unit 430, a delay unit 432, a clock delay estimation unit 434, a clock delay compensation unit 436, a demodulation unit 438, an ideal signal generation unit 440, and a correlation coefficient computation unit 442 to compute the correlation coefficient corresponding to each of n candidate values of the initial phase, and an optimum initial phase determination unit 450 for determining the value closest to the true value among n candidate values of the initial phase based on the n computed correlation coefficients. The above described phase compensation unit 430 corresponds to the first compensation unit, the demodulation unit 438 and the ideal signal generation unit 440 correspond to the above described ideal signal generation unit, the correlation coefficient computation unit 442 corresponds to the above described correlation coefficient computation unit, the optimum initial phase determination unit 450 corresponds to the initial phase determination unit, the clock delay estimation unit 434 corresponds to the first estimation unit, and the clock delay compensation unit 436 corresponds to the second compensation unit.

The true value of the initial phase is within the range between 0 and 360°. Since the OQPSK signal contains four symbol points, the symbol position contained in the compensated base band signal can match the correct symbol position by compensating the phase within the range between 0 and 90°. For example, assume that n equals 9, and the initial phase can be any of the nine candidate values $\phi i=(i-1)\times 10°$ (i=1, 2, . . . , 8, 9).

A phase compensation unit 430-1 computes exp (j$\phi$1) using the initial phase $\phi$1 (=0°), multiplies the input base band signal by the complex number, and compensates the phase of the base band signal corresponding to the initial phase $\phi$1.

The in-phase component of the base band signal phase-compensated by the phase compensation unit 430-1 is input to a delay unit 432-1, thereby the signal (QPSK signal) whose offset has been eliminated is generated. A clock delay estimation unit 434-1 executes estimation of the clock delay based on the QPSK signal. A clock delay compensation unit 436-1 compensates the clock delay estimated by the clock delay estimation unit 434-1 for the base band signal phase-compensated by the phase compensation unit 430-1. When discrete digital data corresponding to the in-phase component and the quadrature component of a base band signal is input, the clock delay compensation unit 436-1 corrects the delay using these pieces of digital data, and computes and obtains the values of the in-phase component and the quadrature component corresponding to the position shifted by the clock delay from the sampling position.

A demodulation unit 438-1 performs the OQPSK demodulating process for the base band signal compensated by the clock delay, and restores the data to the state before the modulation. A ideal signal generation unit 440-1 performs again the OQPSK modulating process on the demodulated data, and generates an ideal base band signal containing no waveform distortion, etc. In the present specification, the ideal base band signal is referred to as an ideal signal.

A correlation coefficient computation unit 442-1 receives an ideal signal output from the ideal signal generation unit 440-1 and a base band signal output from the clock delay compensation unit 436-1, and computes the real part ρ' of the cross-correlation coefficient ρ of the two types of the signal waveforms. The cross-correlation coefficient π indicates the similarity level between two signal waveforms, that is, refers to a waveform quality coefficient indicating how the transmission signal is similar to the ideal signal. The equation of the cross-correlation coefficient ρ and its real part ρ' will be represented below.

$$\rho = \frac{\left|\sum_{k=1}^{M} R_k Z_k^*\right|^2}{\sum_{k=1}^{M} |R_k|^2 \sum_{k=1}^{M} |Z_k|^2} \tag{1}$$

$$\rho' = \frac{\left|\sum_{k=1}^{M} \text{Re}[R_k Z_k^*]\right|^2}{\sum_{k=1}^{M} |R_k|^2 \sum_{k=1}^{M} |Z_k|^2} \tag{2}$$

where $Z_k$ indicates a base band signal output from the clock delay compensation unit 436-1, $R_k$ indicates an ideal signal output from the ideal signal generation unit 440-1, and M indicates the measurement period for each ½ symbol. '*' indicates the complex conjugate, and 'Re [$R_k$ $Z_k^*$]' indicates the real part of $R_k Z_k^*$.

FIG. 6 is a view showing the comparison between the above described cross-correlation coefficient ρ and its real part ρ', and shows the case in which the cross-correlation coefficient indicates the maximum value when, for example, the initial phase $\phi$ is about 40°. As shown in FIG. 6, the above described cross-correlation coefficient ρ is the maximum value around 40° which is the true value of the initial phase φ, and maintains the maximum value in the wide range around 40°. On the other hand, the cross-correlation coefficient ρ' computed using the real part contained in the numerator of the equation of the cross-correlation coefficient ρ' indicates the maximum value only around the true value of the initial phase. Therefore, to extract the optimum initial phase, it is desired to use a cross-correlation coefficient ρ' containing only a real part.

Thus, the cross-correlation coefficient ρ' is computed by the correlation coefficient computation unit 442-1 when the initial phase is φ1. Similarly, the correlation coefficient computation units 442-2 through 442-n compute the cross-correlation coefficient ρ' based on the initial phase of φ2 through φn.

The optimum initial phase determination unit 450 compares and determines n cross-correlation coefficients ρ' computed by the above described n correlation coefficient computation units 442-1 through 442-n, and extracts the optimum initial phase θ corresponding to the maximum value of the cross-correlation coefficient ρ'. In the numerator of the ρ shown in the above described equation (1), the phase difference between $R_k$ and $Z_k^*$ is computed from the total ($\Sigma R_k Z_k^*$) of the complex number before squared to reflect the phase difference on the initial phase θ.

In addition, the initial phase and frequency error estimation unit 410 shown in FIG. 5 comprises a phase compensation unit 460, a delay unit 462, a clock delay estimation unit 464, a clock delay compensation unit 466, a demodulation unit 468, an ideal signal generation unit 470, and a frequency error estimation unit 472 to estimate a frequency error after compensating the initial phase extracted by the optimum initial phase determination unit 450. The above described phase compensation unit 460 corresponds to the fourth compensation unit, and the clock delay estimation unit 464, the clock delay compensation unit 466, the demodulation unit 468, the ideal signal generation unit 470, and the frequency error estimation unit 472 correspond to the second estimation unit.

As in the case in which the above described cross-correlation coefficient ρ' is obtained, a phase is compensated, a clock delay is estimated and compensated, and an ideal signal is generated corresponding to the optimum initial phase θ extracted by the optimum initial phase determination unit 450, and the base band signal output from the clock delay compensation unit 466 and the ideal signal output from the ideal signal generation unit 470 are input to the frequency error estimation unit 472. The frequency error estimation unit 472 estimates a frequency error based on these two signals.

When the initial phase and frequency error estimation unit 410 estimates the value closest to the true value among the n initial phase candidates set for each 10° and the corresponding frequency error, the initial phase and frequency error compensation unit 412 then compensates the phase and frequency corresponding to the estimated initial phase and frequency error respectively.

Similarly, the initial phase and frequency error estimation unit 414 at the second stage estimates the initial phase progressively with higher precision, and estimates the corresponding frequency error. For example, the initial phase and frequency error estimation unit 414 sets five candidate values φ1=θ−4°, φ2=θ−2°, φ3=θ, φ4=θ+2°, φ5=θ+4°) for an initial phase at each 2° within the range of ±4° from the initial phase estimated by the initial phase and frequency error estimation unit 410, and the value closest to the true value is extracted. Then, the initial phase and frequency error compensation unit 416 compensates the phase and frequency of the input base band signal using the above described estimated values.

In addition, the initial phase and frequency error estimation unit 418 at the third stage estimates a more precise initial phase and the corresponding frequency error. For example, the initial phase and frequency error estimation unit 418 sets three candidate values (φ1=θ−1°, φ2=θ, φ3=θ+1°) for an initial phase at each 1° within the range of ±1° from the initial phase estimated by the initial phase and frequency error estimation unit 414, and the value closest to the true value is extracted. Then, the initial phase, frequency error, and clock delay compensation unit 420 compensates the phase and frequency of the input base band signal using the above described estimated values. Simultaneously, it compensates the clock delay estimated by the clock delay estimation unit 464 contained in the initial phase and frequency error estimation unit 418.

The three initial phase and frequency error estimation units 410, 414, and 418 indicate smaller estimation errors of initial phases at later stages with also smaller estimation errors of frequency error, thereby hardly generating demodulation errors with a larger number of evaluation symbols. Therefore, it is desired that the units at later stages have a larger number of evaluation symbols to furthermore improve the estimation precision of a frequency error.

Thus, a value of an initial phase can be obtained efficiently within a short time with high precision by progressively narrowing the estimation range of the initial phase separately at three stages.

[Precise Parameter Estimation Unit]

Figure 7:
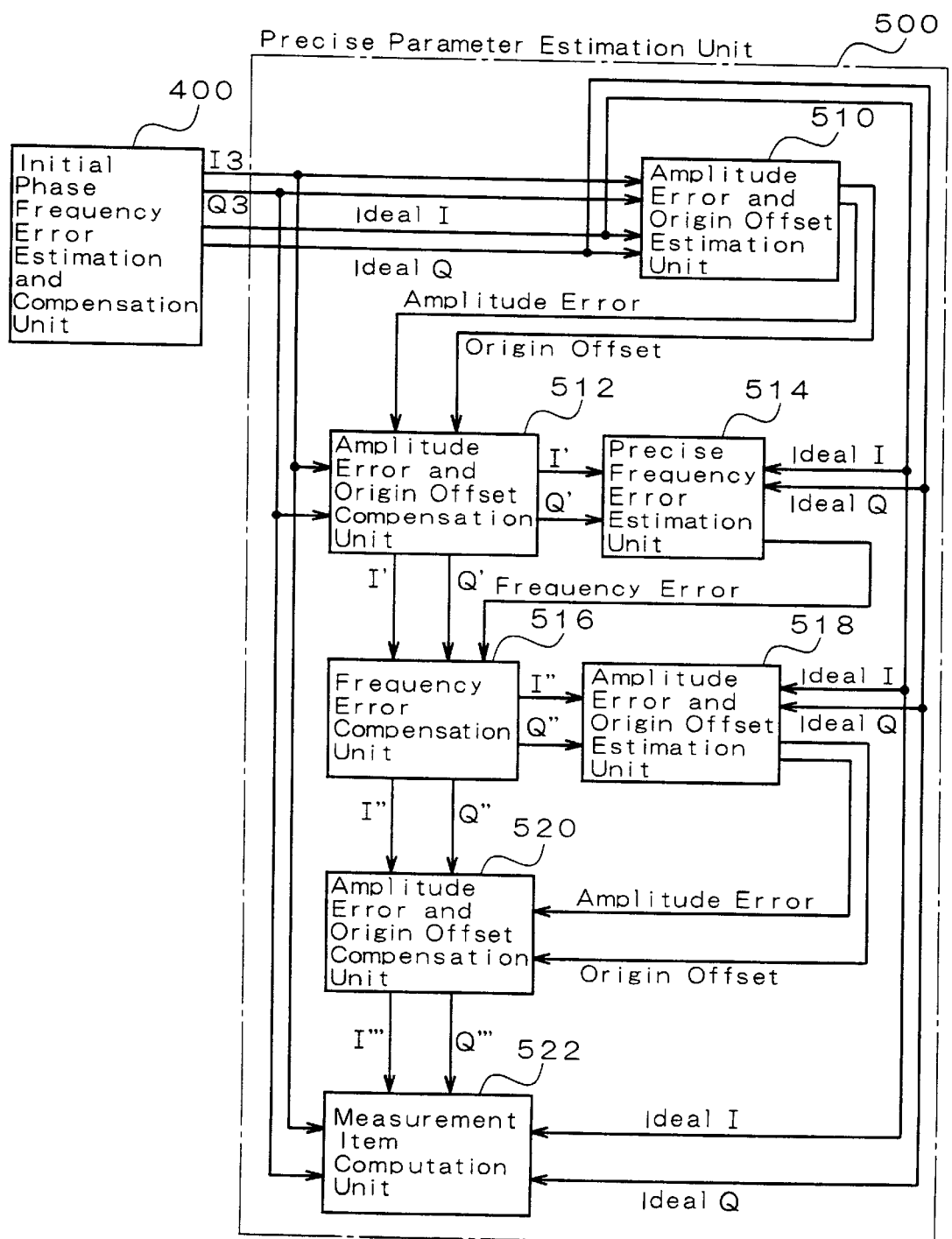
FIG. 7 is a view showing the detailed configuration of the precise parameter estimation unit.
Figure 8:
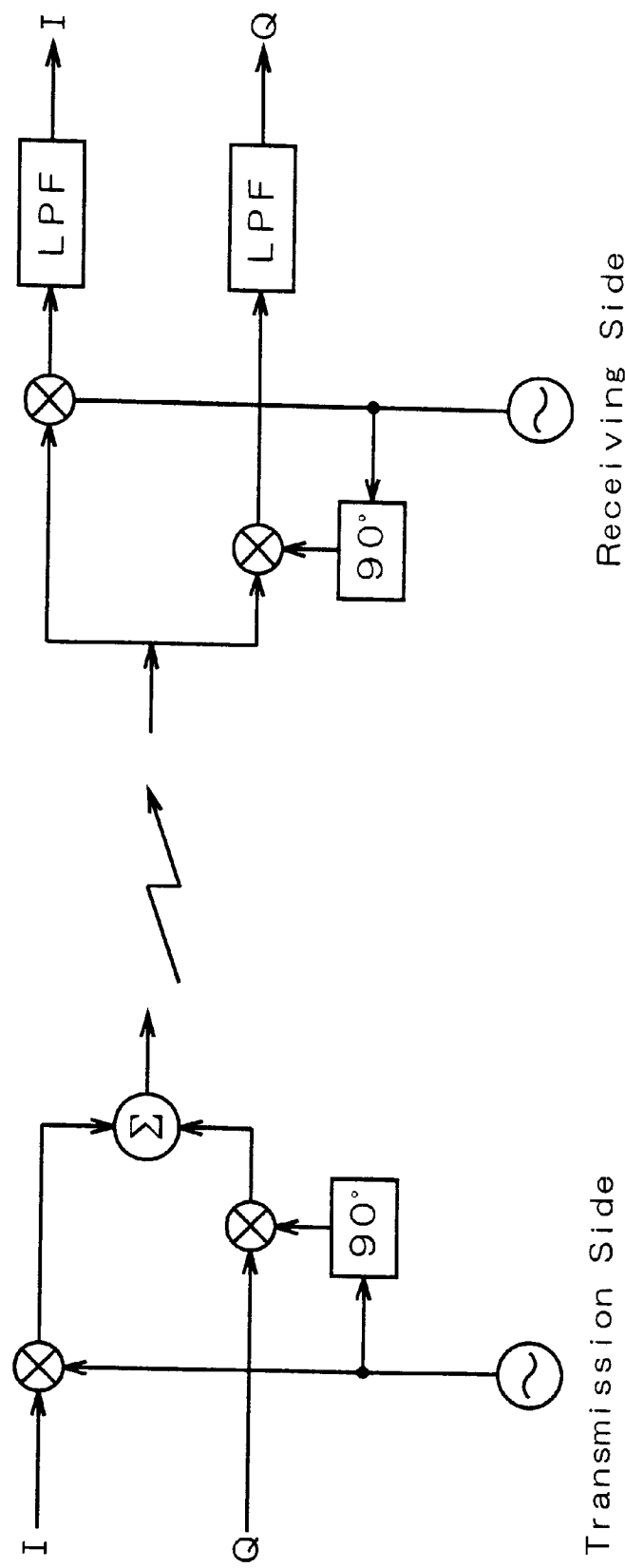
FIG. 8 is a view showing the outline of the coherent detection in a general transmission and reception system in the orthogonal modulation system.

FIG. 7 is a view showing the detailed configuration of the precise parameter estimation unit 500. As shown in FIG. 7, the precise parameter estimation unit 500 comprises amplitude error and origin offset estimation units 510 and 518, amplitude error and origin offset compensation units 512 and 520, a precise frequency error estimation unit 514, a frequency error compensation unit 516, and a measurement item computation unit 522. The initial phase, the frequency error, and the clock delay of the base band signal input to the precise parameter estimation unit 500 have been compensated by the initial phase and frequency error estimation and compensation unit 400 at the former stage. The precise parameter estimation unit 500 estimates and compensates the amplitude error and the origin offset, also estimates and compensates the frequency error precisely, and then finally computes various measurement items.

First, the amplitude error and origin offset estimation unit 510 and the amplitude error and origin offset compensation unit 512 performs the first estimating and compensating processes on the amplitude error and the origin offset of the input base band signal. Thus, using the base band signal (in-phase component I', quadrature component Q') after the origin offset, etc. has been compensated, a frequency error can be estimated precisely. Then, the precise frequency error estimation unit 514 and the frequency error compensation unit 516 estimate and compensate the frequency error precisely using the base band signal after the first compensation for the amplitude error, etc. is carried out.

However, since the amplitude error and origin offset estimation unit 510 first estimates the amplitude error, etc. using a base band signal containing a frequency error, the estimation contains an error corresponding to the frequency error. Therefore, to obtain an amplitude error and an origin offset with smaller error, the amplitude error and origin offset estimation unit 518 and the amplitude error and origin offset compensation unit 520 perform the second estimating and compensating processes on the amplitude error and the origin offset of the base band signal (in-phase component I", quadrature component Q") whose frequency error has been compensated precisely.

The measurement item computation unit 522 finally computes various measurement items using a base band signal (in-phase component I''', quadrature component Q''') whose frequency error, amplitude error, and origin offset have been compensated. As measurement items, for example, a waveform quality ρ, modulation accuracy, a magnitude error, a phase error, etc. are computed, and are output together with the frequency error computed by the precise frequency error estimation unit 514 and the origin offset computed by the amplitude error and origin offset estimation unit 518 as estimation results (analysis results) obtained by the precise parameter estimation unit 500. The waveform quality p, which is one of the measurement items, is computed using the base band signal (in-phase component I3, quadrature component Q3) whose origin offset has not been compensated.

Thus, in the OQPSK modulation analytic system, the initial phase and frequency error estimation and compensation unit 400 can estimate the initial phase of an OQPSK modulated received signal using the cross-correlation coefficient ρ' between an actual signal and an ideal signal. Therefore, a clock delay contained in a received signal can be estimated and compensated. Especially, if a clock delay contained in a received signal can be compensated, then the waveform quality, modulation accuracy, etc. can be computed after making a phase compensation, a frequency compensation, an amplitude error compensation, etc. using the conventional method of performing the QPSK modulation analysis, thereby carrying out the analysis in a general-purpose method.

In addition, when the initial phase and frequency error estimation and compensation unit 400 estimates an initial phase, the estimating operation can be performed separately at a plurality of stages, and a plurality of candidate values for an initial phase can be set for use in an estimating operation at a subsequent stage based on the estimation result obtained at a preceding stage. Therefore, the estimation precision can be progressively enhanced at a later stage, thereby efficiently estimating the initial phase.

The present invention is not limited to the above described embodiments, but other variations can be applied within the scope of the gist of the present invention. For example, according to the above described embodiments, when the initial phase and frequency error estimation and compensation unit 400 estimates an initial phase, three initial phase and frequency error estimation units 310, 314, and 318 progressively improve the estimation precision at three stages. However, the initial phase can also be estimated at two or less states or four or more stages.

In addition, according to the above described embodiment, the initial phase and frequency error estimation and compensation unit 400 performs the operations from phase compensation to cross-correlation coefficient computation in parallel corresponding to n candidate values φ1 through φn for the initial phase. A series of these operations can also be sequentially performed. For example, the candidate value φ1 can be first selected from among n candidate values φ1 through φn for an initial phase, and a series of processes such as a phase compensation, etc. corresponding to the candidate value φ1 are performed to compute the cross-correlation coefficient ρ'. Then, the cross-correlation coefficient ρ' is computed by performing a series of processes such as a phase compensation, etc. corresponding to the second candidate value φ2. Thus, the cross-correlation coefficient ρ' is computed by performing a series of processes such as a phase compensation, etc. corresponding to the n-th candidate value φn. At this time, the method of extracting the largest value from the computed cross-correlation coefficients ρ' can be to sequentially determine the value when a cross-correlation coefficient ρ' is computed as well as to extract it after the computation is completed on n cross-correlation coefficients ρ'.

What is claimed is:

1. An offset QPSK modulation analytic system comprising:

a first compensation unit shifting, corresponding to a candidate value for an initial phase, a phase of a base band signal obtained by orthogonally detecting an offset QPSK modulated signal for which the predetermined candidate value for an initial phase is set;

a first estimation unit generating a QPSK signal by eliminating an offset comprising an quadrature component or an in-phase component of the signal compensated by said first compensation unit, and estimating a clock delay using the QPSK signal;

a second compensation unit compensating the signal compensated by said first compensation unit corresponding to the clock delay estimated by said first estimation unit;

an ideal signal generation unit generating an ideal signal for a signal compensated by said second compensation unit by performing again an offset QPSK modulating process after performing an offset QPSK demodulating process on the signal compensated by said second compensation unit;

a correlation coefficient computation unit computing a correlation coefficient between the signal compensated by said second compensation unit and the ideal signal; and an initial phase determination unit determining whether or not the candidate value set as the initial phase is appropriate based on said correlation coefficient computed by said correlation coefficient computation unit.

2. The system according to claim 1, wherein said initial phase determination unit retrieves a maximum value from among a plurality of said correlation coefficients computed by said correlation coefficient computation unit corresponding to a plurality of said candidate values, and estimates a corresponding candidate value as the initial phase.

3. The system according to claim 2, wherein said initial phase determination unit performs an estimating operation separately at a plurality of stages, sets the plurality of candidate values used in an estimating operation performed at a subsequent stage based on an estimation result obtained at a preceding stage, and improves estimation precision progressively at later stages.

4. The system according to claim 3, wherein said initial phase determination unit performs the estimating operation at the plurality of stages by setting shorter intervals of the plurality of candidate values progressively at later stages.

5. The system according to claim 3, wherein said initial phase determination unit performs the estimating operation at the plurality of stages by setting larger signal length to be computed by said correlation coefficient computation unit progressively at later stages.

6. The system according to claim 1, further comprising a third compensation unit estimating an error of a carrier frequency of an input base band signal, and compensating a frequency corresponding to the estimated error, wherein said base band signal whose frequency has been compensated by said third compensation unit is input to said first compensation unit.

7. The system according to claim 1, further comprising:
a fourth compensation unit compensating a phase of the base band signal using the candidate value determined to be optimum by said initial phase determination unit; and
a second estimation unit estimating a frequency error of the base band signal using a signal compensated by said fourth compensation unit, wherein said initial phase and said frequency error are estimated corresponding to the base band signal.

8. The system according to claim 7, further comprising:
a fifth compensation unit compensating a phase and a frequency for the base band signal based on each estimation result of the initial phase and the frequency error; and
a parameter estimation unit performing various parameter computations based on the base band signal compensated by said fifth compensation unit.

* * * * *